Aug. 11, 1936.  B. J. HASKINS  2,050,529
IGNITION TESTER FOR AUTOMOTIVE ENGINES
Filed May 15, 1930    2 Sheets-Sheet 1
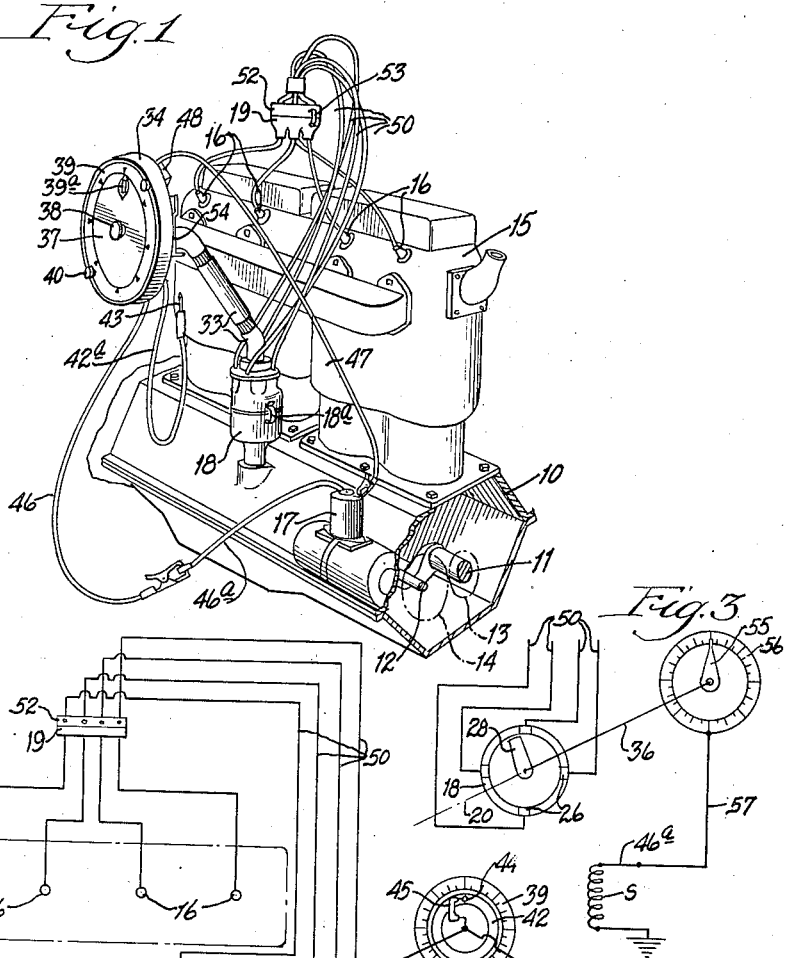
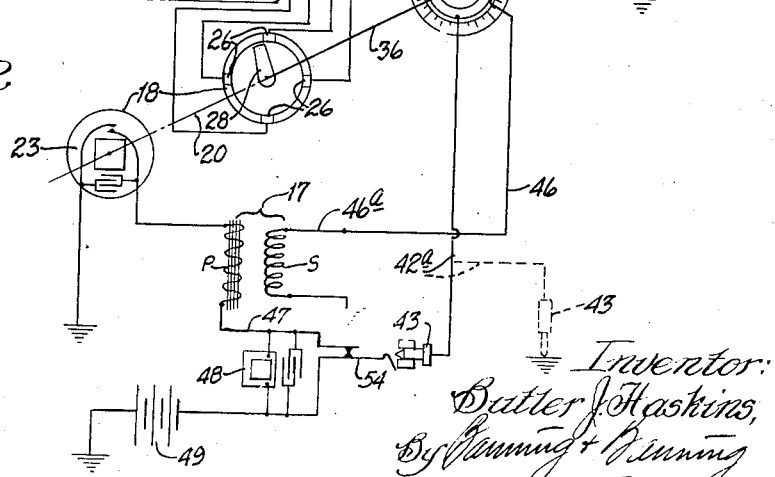

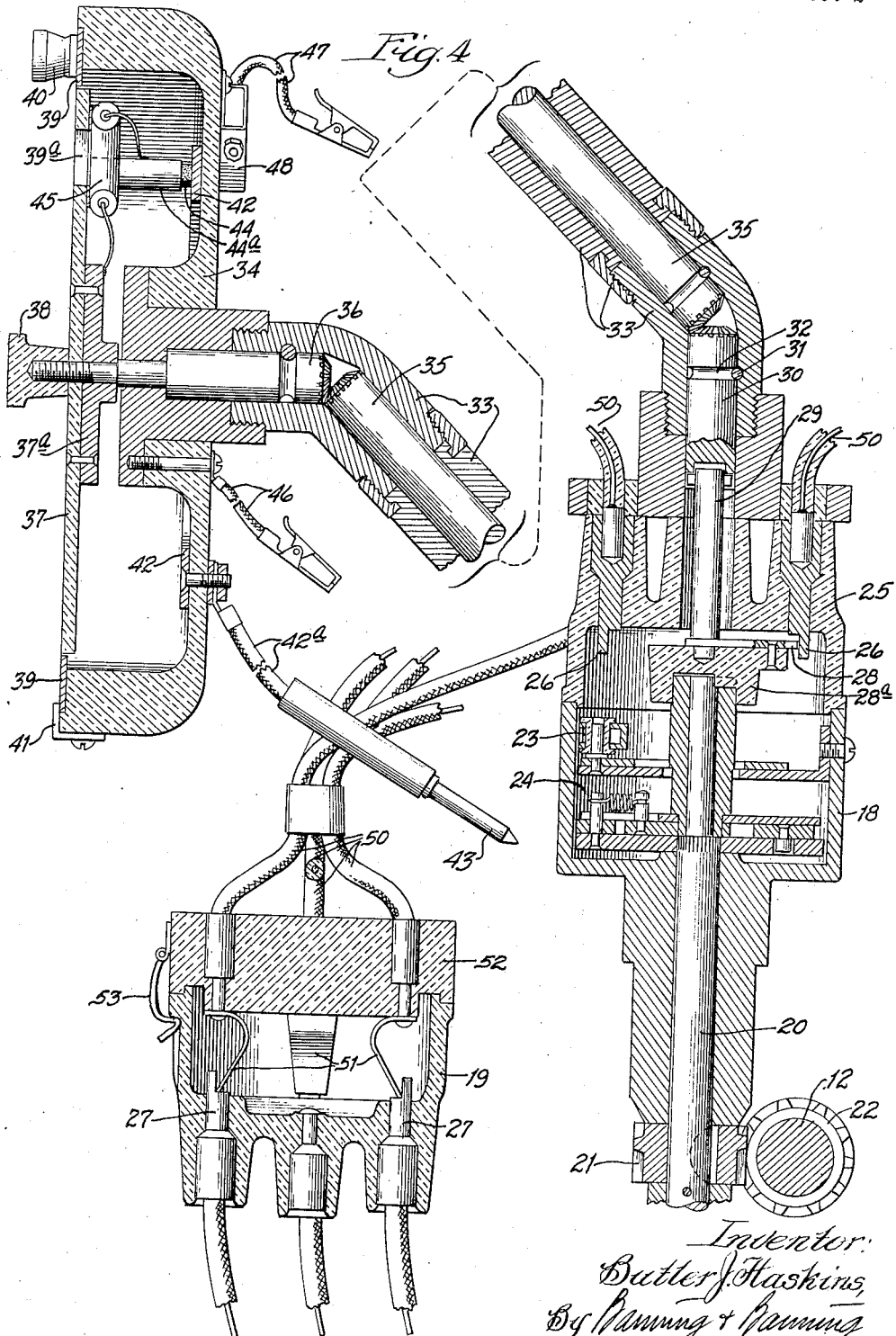

Patented Aug. 11, 1936

2,050,529

UNITED STATES PATENT OFFICE 2,050,529

IGNITION TESTER FOR AUTOMOTIVE ENGINES

Butler J. Haskins, Chicago, Ill., assignor to Joseph Weidenhoff, Inc., Chicago, Ill., a corporation of Illinois Application May 15, 1930, Serial No. 452,546

7 Claims. (Cl. 177—311)

This invention relates to mechanism for testing the ignition of automobile engines and the like under actual working conditions, and is an improvement on my Patent No. 1,748,417, granted February 25, 1930.

An object of this invention is to provide a simple and self-contained testing mechanism which can be readily and quickly connected to an automobile engine for testing the ignition sparks of the engines while it is actually running under its own power or otherwise.

This and other objects, as will later appear, are accomplished by this invention which is fully described in the following specification, and shown in the accompanying drawings, in which—

Figure 1 is a perspective view of a four-cylinder automobile engine with the present invention applied thereto;

Fig. 2 is a wiring diagram showing the ignition system of the automobile and of the tester applied thereto;

Fig. 3 is a partial diagram similar to that of Fig. 2 showing a modified form of the spark indicator; and Fig. 4 is an enlarged vertical section showing the spark indicator and the distributor of the automobile engine to which it is applied.

The embodiment of the ignition tester illustrated is shown in Figure 1 applied to a four-cylinder vertical engine of any well known type having a jump spark ignition such as are used in automobiles, airplanes, motor boats, tractors, and for stationary use. The engine shown has a crank case 10, shown partly in section, in which is journaled a crank shaft 11 which drives a cam shaft 12 as by means of spur gears 13, 14, so that the cam shaft runs at one-half crank shaft speed.

The engine also has cylinders 15 which are secured to the crank case 10, and which carry spark plugs 16 which are energized, as will later be described in more detail, by means of an ignition coil 17, and a distributor having a body 18 and cap 19, which, in operative position, has the cap 19 directly secured to the body 18.

To insert this ignition tester, the cap 19 is removed and laid to one side, while the testing mechanism, shown in Fig. 4, is secured to and supported on the distributor body 18. The distributor shaft 20 has keyed thereon a spiral gear 21 which meshes with a spiral gear 22 on the cam shaft 12, so that the shaft 20 is driven at the same rotatable speed as the cam shaft 12, that is at one-half crank shaft speed.

The distributor may be of any well known type, and has a timer 23, and usually a governor 24. These are well known, and are not shown in detail, the timer, however, being shown diagrammatically in Fig. 2. The distributor body 18 may be rotated to advance or retard the timing of the spark, but the mechanism for doing this also is not shown.

Having removed the distributor cap 19, a false distributor cap 25 of insulating material is placed over the top of the distributor body 18, and is secured thereto by means of spring clips 18ª on the sides in the same manner as is used in securing the cap 19. The false cap 25 carries four metal fingers 26 corresponding exactly in position to the four fingers 27 of the distributor cap 19. It is necessary, however, to remove the usual distributor brush and to replace it with a new distributor brush 28, which is mounted on an insulating block 28ª, which is keyed to the upper end of the shaft 20, and which also carries a short shaft 29 which is operably keyed to a short driving shaft 30 rotatable in the false cap 25, and secured in place by means of a pin 31, which engages a groove 32 in the shaft 31.

The false cap 25 carries a shaft housing 33, which carries at its outer end an indicator case 34 of insulating material. The shaft housing 33 is preferably provided with two 45° bends near its ends so as to bring the front of the indicator case substantially into a vertical position. This, however, is a matter of choice as the indicator, as will later be seen, can stand either vertically, horizontally, or at an angle. This bend permits the tester to avoid the exhaust manifold in most automobiles. The shaft 30 is geared to a shaft 35 journaled in the shaft housing 33, each of these shafts being provided at their meeting ends with meshing bevel gear teeth. The shaft 35 is likewise geared to a shaft 36, which is journaled in the upper end of the shaft housing 33, and which carries a rotatable plate 37 which substantially closes the front of the indicator case 34, and is flush therewith.

The rotatable plate 37 of insulating material is secured to the end of the shaft 36 by means of a nut 38 and a metal hub 37ª, so that it may be rotated on the shaft and fastened at any desired point by means of this nut. Outside the rotatable plate 37 lies an annular plate 39 flush therewith, and carrying a scale, preferably graduated in degrees. This annular plate has one or more knobs 40 by which it can be turned to any desired point. Friction fingers 41 serve to hold it in any adjusted position.

Where the engine construction will permit, the indicator may be mounted directly over the distributor, no separate leads 50 being inserted in that case, the indicator shaft making contact with the brush 28.

The case 34 is hollow and carries an annular metallic ring 42, which is connected by means of a flexible lead 42ᵃ to a metal point 43, the purpose of which will later be explained. A suitable brush 44 bears upon the metal ring 42, and this brush is carried in a suitable metal holder 44ᵃ on the rotatable plate 37. The metal holder 44ᵃ is connected to one end of a neon tube 45, the opposite end of the tube being connected to the metal hub 37ᵃ, which in turn is electrically connected to the distributor brush 28 through the shafts 30, 35 and 36. These shafts are connected through a flexible lead 46 with the secondary lead 46ᵃ of the ignition coil 17, which ordinarily goes to the distributor, but which was removed when the distributor cap 52 was removed. The opposite end of this secondary coil S preferably is grounded on the frame of the engine. The primary P of the ignition coil 17 is connected at one end (Fig. 2) through the timer 23 to ground, while the opposite end is connected through a lead 47 with a buzzer 48 on the back of the indicator case 34, and thence through the usual storage battery 49 to ground. A jack 54 adapted to cooperate with the metal point 43 on the lead 42ᵃ normally shunts the buzzer 48. When the metal point 43 is inserted, the jack switch 54 is opened and the buzzer 48 is operated by the battery 49 so long as the breaker points 23 are closed, thereby producing a succession of sparks at one of the spark plugs 16, and a corresponding lighting of the neon tube 45 for each such spark.

The false distributor cap 25, which is of insulating material, carries a series of distributor fingers 26, one for each of the cylinders of the engine, and these fingers are uniformly distributed about the axis of the shaft 29, and are connected through a series of insulating leads 50, with a series of spring fingers 51 which are carried by an insulating block 52 which is adapted to fit into the distributor cap 19 which had previously been removed, the fingers 51 then making contact with the four fingers 27 of the distributor cap 19. Spring clips 53 serve to hold the block 52 and the cap 19 in assembled relation.

The operation of the device is as follows: With the parts in the positions shown in the drawings, the gasoline engine can be started and will operate in the normal way. The jump spark produced at each of the spark plugs 16 will also be of substantially the same strength and intensity as though the present testing mechanism had not been inserted, and the spark will occur at exactly the same point, and it can be advanced and retarded by means of the usual spark advance (not shown).

As each jump spark occurs the high tension electrical impulse produced will cause a faint impulse to pass through the neon tube 45, and thence to the ring 42. This impulse will be sufficient to cause the tube 45 to light up even if the point 43 is not grounded on the engine frame, but will not be sufficient to diminish to any appreciable extent the intensity of the spark produced at the spark plugs 16.

In order to get a check on the ignition system up to the spark plugs, the operator will hold the point 43 against any of the metal parts of the engine, thereby causing it to be grounded, as shown in dotted lines in Fig. 2. This, of course, only partially shorts the plugs and causes the neon tube to glow brightly at each spark produced at the plugs. If, however, the point 43 is not grounded, the lead 42ᵃ will act to a certain extent as a broadcasting antenna, with the result that the neon tube 45 will be lit up as each spark occurs, but the light so produced will not be as bright as where the point 43 is grounded.

With the gasoline engine operating under its own power, each spark as it is produced will cause an illumination of the tube 45 at the instant the spark occurs. This lighting persists over several degrees of arc. Thus with a four-cylinder engine, as shown, four sparks will occur for each two revolutions of the crank shaft, the engine being of the four-stroke cycle type. Consequently, the neon tube 45 will be caused to glow at four points in each revolution of the plate 37, and these points will start exactly 90° apart. With the engine running at high speed they will occur so rapidly that to the eye there will appear to be four lights glowing continuously at these four points.

A window in the form of a thin slot 39ᵃ is provided in the plate 37, and with the point 43 grounded and the spark plugs temporarily shorted and the engine idling, the spark is not instantaneous, but persists over several degrees of arc, due to the oscillation character of the discharge. These show up as a series of narrow bright lines due to the thin slot 39ᵃ.

By properly setting the annular plate 39 so as to time it with respect to the position of the crank shaft 11, the exact position of the spark advance can be read directly in degrees on the graduated scale of the annular plate 39 at any instant during the operation of the engine.

By inserting the metal point 43 into the jack 54 which is located on the back of the case 34 (Figs. 1 and 4), the jack switch will be opened, thereby causing the buzzer 48 to operate so long as the contact points of the timer 23 are in engagement. So long as the buzzer 48 operates, a series of sparks will occur at the spark plugs 16, and during this same period the neon tube 45 will be caused to glow for each of the sparks produced at the spark plug, with the result that the neon tube 45 will glow over a space occupying several degrees on the dial 37, instead of at a single point as before. In this way, the breaker points can be tested for each of the cylinders, as it will show when the breaker points come into contact, and when that contact is broken.

When making the buzzer test described above it is obvious that the engine will not continue to operate under its own power as the flow of current to the primary winding of the coil will be repeatedly interrupted by the buzzer 48 during the period of time that the breaker points are closed.

During these tests a person accustomed to this device can tell by the brilliance and steadiness of the flashes of the neon tube not only the strength and character of the spark which is passing each of the spark plugs, but these can be compared by the intensity of the impulses received by the neon tube 45 for each of the cylinders.

In Fig. 3 is shown a modified form of the device in which a jump spark is provided in series with the jump spark of the spark plugs, which serves as a visual indicator of the condition and position of the jump spark for each of the cylinders in place of the neon tube arrangement of Fig. 2. This consists of a metal pointer 55 which takes the place of the plate 37, and which travels over a graduated ring 56 but which is spaced therefrom about .015 to .025 of an inch. The ring 56 is connected through a flexible lead 57 with the high tension flexible lead 46ᵃ which has previously been removed from the center of the distributor cap 52. This lead thus connects with one end of the high tension or secondary coil S, the other end of this coil being connected to ground.

The operation of this device is as follows: When the breaker points of the timer 23 are opened a high tension surge occurs in the secondary coil S which passes through the lead 57, the metal ring 56, and jumps to the outer end of the pointer 55, thence passes through the shafts 36, 35, 30, and 29 to the brush 28, thence through the finger 26 to the lead 50, and thence through the spring 51 to the finger 27, and on to the spark plug 16 where another spark is simultaneously produced in the engine cylinder.

Thus it will be seen that by this arrangement a series of jump sparks in series with the jump spark of the engine occur at four points separated at 90° apart on the graduated scale of the metal ring 56. A little practice will enable the operator to tell much about the position and intensity of the spark occurring in the engine cylinder from an observation of the sparks which are thus produced at the end of the pointer 55 in much the same way as that which has been previously described in connection with the apparatus shown diagrammatically in Fig. 2.

While I have shown and described but a few embodiments of my invention, it is to be understood that it is capable of many modifications. Changes, therefore, in the construction and arrangement may be made which do not depart from the spirit and scope of the invention as disclosed in the appended claims.

I claim:

1. Ignition testing mechanism for a gasoline automotive engine having a jump spark ignition system including a distributor having an insulating housing, a brush rotatable therein on the distributor shaft, a removable cap having metal terminals, and a series of spark plugs each electrically connected by a lead to one of the terminals in the distributor cap, said mechanism comprising an indicator casing, a member having terminals corresponding to the terminals of the cap, the member being supported by the engine distributor housing with the corresponding terminals of the cap and member electrically connected together, the indicator casing being mounted on said member and having a graduated dial and an indicating means rotatably associated therewith, said indicating means having a driving connection with the distributor shaft of the engine and adapted to be connected in an electrical circuit with the distributor brush.

2. Ignition testing mechanism for a gasoline automotive engine having a jump spark ignition system including a distributor having an insulating housing, a brush rotatable therein on the distributor shaft, a cap having metal terminals, and a series of spark plugs each electrically connected by a lead to one of the terminals in the distributor cap, said mechanism comprising a member having metal terminals, said member being supported by the distributor body and including a graduated dial and high tension leads electrically connecting its terminals with corresponding terminals of the distributor cap, and a spark indicator rotatably carried by said means for cooperation with said dial and connected to the distributor shaft of the engine, said indicator being electrically connected to the distributor brush.

3. Ignition testing mechanism for a gasoline automotive engine having a jump spark ignition system, including a distributor having an insulating housing, a brush rotatable therein on the distributor shaft, a removable cap having metal terminals, and a series of spark plugs each electrically connected by a lead to one of the terminals in the distributor cap, said mechanism comprising an indicator casing mounted on a false cap, said false cap having terminals corresponding to the metal terminals of the removable cap and adapted to be secured to the distributor housing with the corresponding terminals of the two caps electrically connected together, the indicator casing having a graduated dial and an indicating means rotatably associated therewith, and said indicating means having a driving connection with the distributor shaft and an electrical connection with the distributor brush.

4. Ignition testing mechanism for a gasoline automotive engine having a jump spark ignition system including a distributor having an insulating housing, a brush rotatable therein on the distributor shaft, a removable cap having metal terminals, and a series of spark plugs each electrically connected by a lead to one of the terminals in the distributor cap, said mechanism comprising an indicator casing including an indicator, a false cap having terminals corresponding to the terminals of the removable cap, the false cap being adapted to be secured to the engine distributor housing, means electrically connecting the terminals of the false cap to the corresponding terminals of the removable cap, the indicator casing being supported on a hollow tube which is carried by the false cap, a shaft rotatable in the tubing and operably connecting the distributor shaft and indicator, said casing having a graduated dial, and means adapted to connect said indicator and the distributor brush in an electrical circuit.

5. Ignition testing mechanism for a gasoline automotive engine having a jump spark ignition system including a distributor having an insulating housing, a brush rotatable therein on the distributor shaft, a removable cap having metal terminals, and a series of spark plugs each electrically connected by a lead to one of the terminals in the distributor cap, said mechanism comprising an indicator casing mounted on a false cap having terminals corresponding to the metal terminals of the removable cap, means electrically connecting the corresponding terminals of the two caps, the false cap being adapted to be secured to the engine distributor housing with the indicator casing having a graduated dial and an opaque member having a radial slot rotatable near the dial, a neon tube behind the slot, means for driving the opaque member by the distributor shaft of the engine, and means electrically connecting the neon tube to the distributor brush to be energized at each electrical impulse so as to indicate the timing and intensity of the spark delivered to each spark plug.

6. Ignition testing mechanism for a gasoline automotive engine having a jump spark ignition system including a distributor having an insulating housing, a distributor brush shaft rotatable therein, a removable cap having metal terminals, and a series of spark plugs each electrically connected by a lead to one of the terminals in the distributor cap, said mechanism comprising a member adapted to be secured to the top of the distributor body after the distributor cap has been removed, said member having a distributor brush adapted to be operably connected to the upper end of the distributor brush shaft so as to be driven thereby, an opaque element operably connected to the distributor brush so as to be rotatable therewith and having a radial slit, a gaseous discharge tube beneath the slit, a graduated scale carried by said member adjacent the slit in said opaque element, a series of spaced metal terminals in the member, each adapted to receive the high voltage discharge from the distributor brush, means electrically connecting the terminals in said member to the corresponding terminals in the removable cap, a metal ring carried by said member, and means for electrically connecting one side of the gaseous discharge tube to said ring and the other side to the distributor brush whereby each electrical impulse passing the distributor brush energizes a spark plug and simultaneously produces a flash in the rotating slit thereby indicating the timing and intensity of the spark delivered to that spark plug.

7. Ignition testing mechanism for a gasoline automotive engine having a jump spark ignition system including a distributor having an insulating housing, a brush shaft rotatable therein, a removable cap having metal terminals, and a series of spark plugs each electrically connected by a lead to one of the terminals in the distributor cap, said mechanism comprising a member adapted to be secured to the top of the distributor body after the removable cap has been removed, said member having a distributor brush adapted to be operably connected to the upper end of the distributor shaft so as to be driven thereby, an indicator operably connected to the distributor brush so as to be rotatable therewith, a graduated metal ring carried by said member adjacent the indicator, a series of spaced metal terminals in the member, each adapted to receive the high voltage discharge from the rotating distributor brush, means electrically connecting the terminals of said member to the corresponding terminals of the removable cap, and means for electrically connecting the indicator to the distributor brush.

BUTLER J. HASKINS.